Patented July 6, 1943

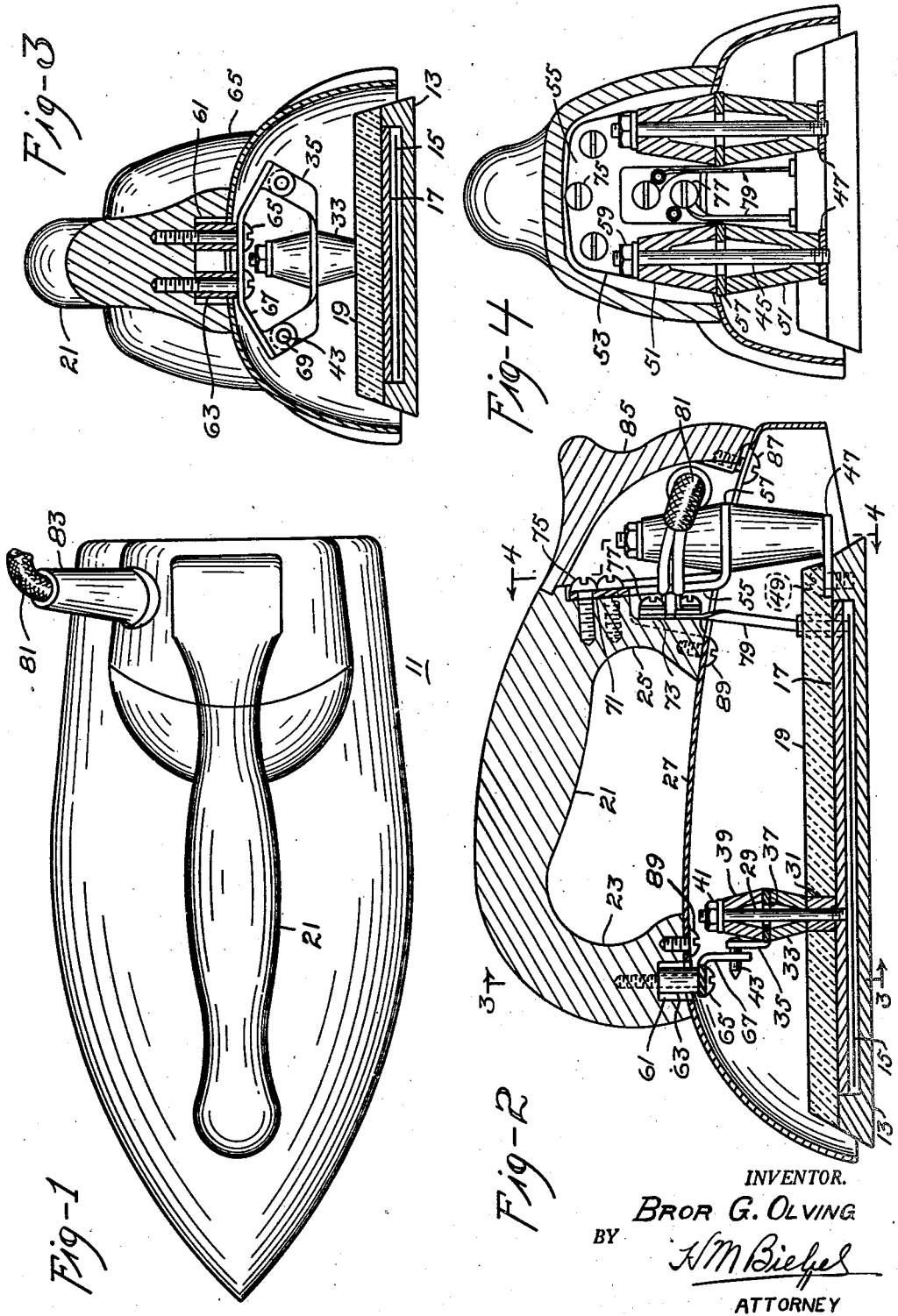

2,323,414

UNITED STATES PATENT OFFICE 2,323,414

ELECTRIC IRON

Bror G. Olving, Elgin, Ill., assignor to McGraw Electric Company, Elgin, Ill., a corporation of Delaware Application November 15, 1941, Serial No. 419,247

3 Claims. (Cl. 38—89)

My invention relates to electric sadirons.

An object of my invention is to provide an electric iron having a relatively cool outer casing.

Another object of my invention is to provide an electric iron having a casing supported by the handle.

Still another object of my invention is to provide an electric iron having a handle and casing supporting means permitting of easy and quick mounting of the handle and the casing on the heated body of the iron.

Other objects of my invention will either be apparent from the following description of one form of device embodying my invention or will be pointed out in the course of such description and set forth in the appended claims.

In the single sheet of drawings,

Figure 1 is a top plan view of an iron embodying my invention,

Fig. 2 is a longitudinal vertical section taken through substantially the center of the iron, Fig. 3 is a cross-sectional view on the line 3—3 of Fig. 2, and, Fig. 4 is a lateral sectional view taken on the line 4—4 of Fig. 2.

It is, of course, well known in the art that the amount of electrical energy which is now translated into heat in the electric heating unit of an ordinary sadiron of the domestic type has been increased to at 1000 watts and this has brought with it relatively high operating temperatures of the handle and of the casing of such irons and my improved construction has to do more particularly with relatively simple and inexpensive means for ensuring that the casing and handle shall operate at relatively low temperatures, even after long periods of use of such an iron.

I have illustrated an iron 11 as being of the usual triangular outline and comprising a soleplate 13 and insulated electric heating element 15 in the recessed top surface of the soleplate 13, together with a top or clamping plate 17. The members 13, 15 and 17 constitute what may be called the heated body and I have shown these generally only since they constitute no part of my invention. I provide also a block or layer 19 of any suitable heat insulating material which is shown as resting upon and against the upper surface of the heated body and it is to be understood that any suitable or desired means may be used to hold the heat-insulating member 19 in its proper operative position.

I provide a sadiron handle 21 which is preferably made with a front depending supporting portion 23 and a rear depending supporting portion 25. Preferably, this handle is made of a suitable heat-insulating material, which, for illustrative purposes only, may be considered to be some one of the moulded plastic materials now generally used for such purposes.

I provide further a casing 27 which is of the usual hollow shape and is large enough to be out of contact with the heated body and while I have shown it to have a lower edge extending to below the upper surface of the heated body, my invention is not limited thereto, the main idea being to keep the casing out of engagement with the heated body.

Means for supporting the handle and the casing include a plurality of heat-insulating members. I provide a stud 29 in the front end portion of the iron and this may have screw-threaded engagement, at its lower end, with the top plate 17. I provide a bushing 31 of heat-insulating material and of generally tubular shape which may either be separate and of a height substantially equal to the thickness of the heat-insulating block 19 or it may be integral with a tubular member 33 of inverted conical shape. For illustrative purposes the heat-insulating bushings may be made of a heat-insulating material having high compressive strength, such as a ceramic material, "Mycale" glass or some similar material which can withstand a continuous operating temperature of 600° F. or over. The stud 29 has mounted thereon a supporting bracket 35 which is of a material having a high thermal reluctance such as stainless steel and of substantially U-shape, as will be noted by reference to Figs. 2 and 3 of the drawing. The bracket 35 is provided with a central aperture 37 and its intermediate portion is adapted to rest on the upper surface of bushing 33 and be engaged by the lower surface of an upper bushing 39 which is substantially the same as bushing 33. These two bushings are clamped tightly into engagement with the bracket 35 by a nut 41 on the stud 23. The upwardly extending end portions of the bracket 35 are each provided with pins 43 secured to the member 35 and extending forwardly thereof, as will be noted by reference to Fig. 2 of the drawing.

I provide a pair of heat-insulating supports similar in shape to the forward stud but larger at the rear end of the heated body. Each of these heat-insulating supports includes a stud 45 the lower end of which has screw-threaded engagement with a short strap 47 of metal which is held against the upper surface of the rear end of the heated body by a screw or screws 49. I provide a lower tubular bushing 51 of inverted cone shape and of heat-insulating material and an upper similar bushing 51 of cone shape on each of the studs 45.

I provide a rear supporting bracket of substantially inverted U-shape 53 having a substantially vertically extending mid-portion 55 and substantially horizontally extending lower end portions 57, these end portions being provided with an aperture and being positioned between the upper and the lower cone shaped heat-insulating members 51. The bracket 53 is made of material having a high thermal reluctance such as stainless steel. A nut 59 is provided at the upper end of each of the studs 45 to tightly clamp the two heat-insulating bushings 51 against the end portions 57 of the supporting bracket 53.

The front depending portion 23 of the handle has a recess 61 in its lower surface in which are located two tubular bushings 63 of a heat-insulating material similar to the bushings 39 and 51, which bushings are held in proper operative position in the recess 61 by bolts 65. A bracket 67 of relatively flat inverted U-shape is clamped in proper operative position between the lower ends of the two bushings 63 and the heads of the bolts 65. The depending end portions of bracket 67 are provided respectively with an opening 69 in which the pins 43 may fit.

The rear end portion of the handle and including the rear depending portion 25 may be made with two stepped supporting surfaces 71 and 73, the mid portion 55 of the bracket 53 having flat face engagement with the surface 71 and being held tightly thereagainst by screws 75.

The surface 73 may have a plurality of short machine screws 77 in screw-threaded engagement therewith to constitute a pair or a plurality of terminals, leads 79 being connected therewith from the end portions of the heating element 15.

A twin conductor cord 81 has its ends connected to the proper contact terminals and while I have not shown any thermal control switch for controlling the temperature of the iron, I may provide such control but since this does not constitute any part of my present invention, I have not shown such construction. The cord 81 may extend outwardly through a resilient elongated bushing 83 in a manner well known in the art.

A closure means for the rear end portion of the handle may include a relatively hollow block 85 of a material similar to the handle 21 and having a shape and outline complementary to the handle and to the rest of the iron. The member 85 may be held in proper place by interlocking engagement at its upper end with the upper portion of the handle and its lower portion may be held against the rear end portion of casing 27 as by one or more screws 87. The casing 27 is supported from the front and rear handle portions 23 and 25 as by screws 89 extending through the casing and into screw threaded engagement with the handle supports. It will be noted that the handle 21 is directly supported from and by the heated body through and by means providing a relatively high thermal reluctance to any heat which might tend to be conducted from the heated body to the supporting means and to the handle. The casing 27 is supported only by the handle screws 89 extending through the casing into the front and the rear depending handle supporting portions.

It is, therefore, clear that I provide a sadiron in which a handle, made of a heat-insulating material, is supported by means providing relatively high thermal reluctance as well as large physical strength so that the amount of heat conducted from the heated body to the handle is relatively small. As pointed out, the metal bracket members 35, 67 and 53 are preferably made of some metal which likewise has a relatively high thermal reluctance.

The support of the casing from the handle, the casing being out of engagement with the heated body, has the result that the casing will operate at a relatively low temperature as far as heat conducted thereto from the heated body is concerned. The use of a block 19 of heat-insulating material is of further help in reducing the amount of heat radiated from the heated body upwardly against the inner surface of the casing and I may further provide any suitable or desired means such as a heat-reflecting, highly polished or plated surface on the under side of casing 27 to still further reduce the amount of heat reaching the casing 27 by radiation.

It is thus evident that my invention provides a relatively simple iron in which the removal of the rear closure member 83 and the removal of a few screws, including screws 75 and 77, will permit of removing the handle and the casing by raising the rear end portion of the handle and then moving it and the casing forwardly to cause disengagement of the pins 43 from the upper supporting bracket 67. Conversely it is relatively easy to assemble such an iron by first having the pins 43 extend through the openings 69 in the upper bracket 67 and then inserting the screws 75 and thereafter the screws 77, after which the rear closure member 85 can be again placed in its proper operative position and held therein by the screw or screws 87.

Various modifications may be made in the structure embodying my invention and all such modifications clearly coming within the scope of the appended claims shall be considered to be covered thereby.

I claim as my invention:

1. An electric iron comprising a heated body, a vertically-extending stud on said body at the front end thereof, a supporting-bracket heat-insulatedly supported on said stud, a pair of substantially horizontally-extending pins on said bracket, a pair of vertically extending studs supported by said body at the rear end thereof, heat-insulating bushings secured on said last named studs, a supporting bracket held by said heat-insulating bushings, a handle having a front and a rear depending portion, a bracket secured to said front depending handle portion and having a pair of openings to receive said pair of pins, means to secure the bracket held by the heat insulating bushings on said pair of rear studs to the rear end portion of the handle and a casing for the iron secured against the lower ends of the depending front and rear handle portions and held out of engagement with said heated body.

2. An electric iron comprising a heated body, a plurality of vertically extending studs on said body near the front and the rear ends thereof, a pair of heat-insulating elongated bushings on each of said studs, a bracket clamped between said pairs of heat-insulating bushings, a pair of substantially horizontally-extending pins on the bracket secured to said front stud, a handle having depending front and rear portions, a bracket secured to the depending front handle portion and having a pair of openings therein to receive said pair of pins on the bracket on the front stud, screws to secure the bracket on the rear studs to the rear surface of the handle, and a hollow casing secured against the lower ends of the depending handle portions.

3. An electric iron comprising a heated body, a plurality of spaced studs secured to said body, a pair of tubular heat-insulating members held on each of said studs, a handle having depending front and rear supporting portions, supporting brackets clamped between said pairs of tubular heat-insulating members and supporting said handle by operative engagement with said depending supporting portions, a hollow casing covering said heated body and means engaging the front and the rear supporting portions at points spaced from the handle-supporting means for supporting the casing out of engagement with the heated body to reduce the amount of heat conducted to the casing from the heated body.

BROR G. OLVING.